(12) United States Patent
Kanevsky et al.

(10) Patent No.: US 12,061,688 B2
(45) Date of Patent: Aug. 13, 2024

(54) DEVICE PROVISIONING USING SECURE CREDENTIALS FOR A FIRST DEPLOYMENT

(71) Applicant: Dell Products L.P., Round Rock, TX (US)

(72) Inventors: Arkady Kanevsky, Cedar Park, TX (US); Jonathan Peter Streete, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 477 days.

(21) Appl. No.: 17/193,431

(22) Filed: Mar. 5, 2021

(65) Prior Publication Data

US 2022/0284089 A1    Sep. 8, 2022

(51) Int. Cl.
*G06F 21/45* (2013.01)
*G06F 8/60* (2018.01)
*H04L 9/40* (2022.01)

(52) U.S. Cl.
CPC ............. *G06F 21/45* (2013.01); *G06F 8/60* (2013.01); *H04L 63/0428* (2013.01)

(58) Field of Classification Search
CPC .................................. G06F 8/60; G06F 21/45
USPC ............................................................ 726/6
See application file for complete search history.

(56) References Cited

U.S. PATENT DOCUMENTS

| | | | |
|---|---|---|---|
| 7,216,361 B1 * | 5/2007 | Roskind | G06F 21/41 726/8 |
| 7,237,104 B2 * | 6/2007 | Philyaw | G06F 16/9554 713/1 |
| 9,100,396 B2 * | 8/2015 | O'Connor | G06F 21/105 |
| 9,740,870 B1 * | 8/2017 | Shepard | G06F 21/60 |
| 2007/0124411 A1 * | 5/2007 | Dandekar | G06F 8/65 709/217 |
| 2008/0222734 A1 * | 9/2008 | Redlich | H04L 9/3271 726/26 |

(Continued)

OTHER PUBLICATIONS

Preston et al., 2019 IEEE, "Integrating Cyber Security Requirements Into A Power Management System", pp. 131-138 (Year: 2019).*

*Primary Examiner* — Khalil Naghdali
(74) *Attorney, Agent, or Firm* — McDermott Will & Emery LLP

(57) ABSTRACT

A disclosed method includes assigning a unique identifier to a computer product instance, such as a server, switch, router, or storage device, to be deployed at a data center or other location on behalf of a customer, generating security credentials for the computer product dependent on the identifier, obtaining the credentials by a customer-side automated deployment agent, and using them by the deployment agent during deployment of the computer product. The credentials may be generated by a supplier-side credential management system, then requested and received by the deployment agent over a secure communication channel. The credentials may be generated by a program shared between the supplier-side credential management system and the deployment agent. The identifier may identify a hardware or software component or be selected by the supplier or customer. The credentials may include a username, password, token, cryptographic key, or digital certificate for a first login.

20 Claims, 9 Drawing Sheets

(56) References Cited

U.S. PATENT DOCUMENTS

2013/0151583 A1\* 6/2013 O'Connor .............. G06Q 20/34
　　　　　　　　　　　　　　　　　　　　　　709/202
2014/0164781 A1\* 6/2014 Joshi ..................... H04L 9/3271
　　　　　　　　　　　　　　　　　　　　　　713/184

\* cited by examiner

500

502
CUSTOMER-SIDE AUTOMATED DEPLOYMENT AGENT ASSIGNS OR OTHERWISE OBTAINS A CUSTOMER ID FOR A PARTICULAR COMPUTER PRODUCT INSTANCE TO BE DEPLOYED AT THE CUSTOMER SITE

504
CUSTOMER-SIDE AUTOMATED DEPLOYMENT AGENT OBTAINS A UNIQUE ID FOR THE COMPUTER PRODUCT INSTANCE

506
CUSTOMER-SIDE AUTOMATED DEPLOYMENT AGENT PROVIDES AN AUTHENTICATION CREDENTIAL OF THE CUSTOMER AND THE UNIQUE ID FOR THE COMPUTER PRODUCT INSTANCE TO A CREDENTIAL MANAGEMENT SYSTEM AT A SUPPLIER SITE OVER A SECURE COMMUNICATION CHANNEL

508
CREDENTIAL MANAGEMENT SYSTEM GENERATES OR RETRIEVES SECURITY CREDENTIALS FOR THE COMPUTER PRODUCT INSTANCE BASED ON THE CUSTOMER IDENTIFIER AND THE ASSIGNED UNIQUE IDENTIFIER

510
CUSTOMER-SIDE DEPLOYMENT AGENT RETRIEVES THE SECURITY CREDENTIALS FROM THE CREDENTIAL MANAGEMENT SYSTEM OVER THE SECURE COMMUNICATION CHANNEL USING THE CUSTOMER ID AND UNIQUE ID

512
CUSTOMER-SIDE AUTOMATED DEPLOYMENT AGENT USES THE SECURITY CREDENTIALS TO LOG INTO THE COMPUTER PRODUCT INSTANCE AND TO COMPLETE DEPLOYMENT

514
CUSTOMER-SIDE AUTOMATED DEPLOYMENT AGENT GENERATES NEW SECURITY CREDENTIALS FOR THE COMPUTER PRODUCT INSTANCE SUBSEQUENT TO COMPLETION OF DEPLOYMENT

752
SUPPLIER SHIPS A COMPUTER PRODUCT INSTANCE TO A CUSTOMER SITE (OPTIONALLY INCLUDING A UNIQUE ID OF COMPUTER PRODUCT INSTANCE)

754
(OPTIONALLY) CUSTOMER-SIDE DEPLOYMENT AGENT ASSIGNS A UNIQUE ID TO THE COMPUTER PRODUCT INSTANCE AT THE CUSTOMER SITE

756
CUSTOMER-SIDE DEPLOYMENT AGENT ASSIGNS OR OBTAINS A CUSTOMER ID FOR THE PARTICULAR COMPUTER PRODUCT INSTANCE

758
DEPLOYMENT AGENT PROVIDES CUSTOMER ID (AND, OPTIONALLY, THE UNIQUE ID FOR COMPUTER PRODUCT INSTANCE) TO A SUPPLIER-SIDE VENDOR MANAGEMENT SYSTEM OVER A SECURE COMMUNICATION CHANNEL

760
DEPLOYMENT AGENT PROVIDES A SHARED CREDENTIAL GENERATION PROGRAM TO A SUPPLIER-SIDE CREDENTIAL MANAGEMENT SYSTEM OVER THE SECURE COMMUNICATION CHANNEL

762
DEPLOYMENT AGENT GENERATES SECURITY CREDENTIALS FOR COMPUTER PRODUCT INSTANCE BASED ON UNIQUE ID AND (OPTIONALLY) THE CUSTOMER ID USING THE SHARED CREDENTIAL GENERATION PROGRAM

764
SUPPLIER-SIDE CREDENTIAL MANAGEMENT SYSTEM GENERATES SECURITY CREDENTIALS FOR THE COMPUTER PRODUCT INSTANCE BASED ON UNIQUE ID AND (OPTIONALLY) THE CUSTOMER ID USING THE SHARED PROGRAM

766
DEPLOYMENT AGENT USES SECURITY CREDENTIALS TO LOG IN TO COMPUTER PRODUCT INSTANCE AND COMPLETE DEPLOYMENT

768
DEPLOYMENT AGENT GENERATES NEW SECURITY CREDENTIALS FOR THE COMPUTER PRODUCT INSTANCE SUBSEQUENT TO DEPLOYMENT

FIG. 7B

DEVICE PROVISIONING USING SECURE CREDENTIALS FOR A FIRST DEPLOYMENT

BACKGROUND

Field of the Disclosure

This disclosure relates generally to information handling systems and, more particularly, to device provisioning using secure credentials for a first deployment.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as data center computing, financial transaction processing, airline reservations, enterprise data storage, or global communications. In addition, information handling systems may include a variety of hardware and software components that may be configured to process, store, and communicate information and may include one or more computer systems, data storage systems, and networking systems.

Data center devices, such as servers, switches, data storage systems, or other information handling systems, are commonly manufactured with default username and default password combinations that enable a customer user to install and configure them upon delivery to the user's location. Using the same username/password combination for every device may simplify the process of automated deployment, but this approach is not secure, as it may expose the devices to in-transit or customer-site attacks by rogue actors. For example, in many cases, the default credentials are available in online forums or are otherwise publicly available to the detriment of the security of these devices. Manufacturers expect customer administrators or end users to change the default credentials when the devices are activated and/or fully installed. However, customers may fail to reset the default credentials or may fail to delete default account information when adding new user accounts. Such scenarios expose the devices to unsophisticated attacks by authorized parties, either within the supply chain or via network access, that threaten the security of the target device and/or associated network system.

In an alternate approach, a unique password may be generated for each device and delivered on a piece of paper in packing box containing the device when shipped it is to a customer site. While this approach may be more secure than an approach that uses a default username/password combination, it is not amenable to automation. For example, even if the customer's deployment service is otherwise automated, a human operator must identify the unique credentials for each device and manually enter them into the deployment service. This prevents true zero-touch deployment, which is increasingly important as intelligence moves closer to the network edge.

SUMMARY

In one aspect, a disclosed method for provisioning a computing device includes assigning a unique identifier to a computer product instance to be deployed at a customer site, generating, by a supplier of the computer product instance, security credentials for the computer product instance dependent on the assigned unique identifier, obtaining, by a customer-side automated deployment agent, the security credentials for the computer product instance that were generated dependent on the assigned unique identifier, and using, by the customer-side automated deployment agent, the security credentials during deployment of the computer product instance.

In any of the disclosed embodiments, generating the security credential may include a supplier-side credential management system generating the security credentials, and the supplier-side credential management system storing the security credentials, and obtaining the security credentials may include the customer-side automated deployment agent requesting and receiving the security credentials from the supplier-side credential management system over a secure communication channel.

In any of the disclosed embodiments, generating the security credential may include generating the security credentials using a shared credential generation program, the method may further include providing the shared credential generation program to the customer-side automated deployment agent, and obtaining the security credentials may include the customer-side automated deployment agent generating the security credentials using the provided shared credential generation program.

In any of the disclosed embodiments, generating the security credential may include receiving a shared credential generation program from the customer-side automated deployment agent and generating the security credentials using the shared credential generation program, and obtaining the security credentials may include the customer-side automated deployment agent generating the security credentials using the shared credential generation program.

In any of the disclosed embodiments, generating the security credentials for the computer product instance may be further dependent on a customer identifier or end-user identifier associated with the computer product instance.

In any of the disclosed embodiments, the unique identifier assigned to the computer product instance may include an identifier of a hardware or software component of the computer product instance.

In any of the disclosed embodiments, assigning the unique identifier to the computer product instance may include the supplier or customer selecting the unique identifier.

In any of the disclosed embodiments, using the security credentials during deployment of the computer product instance may include using the security credentials for a first login to an operating system executing on the computer product instance, a first login to application software executing on the computer product instance, or a first login to a management environment executing on the computer product instance.

In any of the disclosed embodiments, using the security credentials during deployment of the computer product instance may include using the security credentials for a first login to a baseboard management controller of the computer product instance.

In any of the disclosed embodiments, the computer product instance may include a compute server, network switch, router device, or storage device to be deployed at the customer site.

In any of the disclosed embodiments, the security credentials may include one or more of an access username, an access password, an access cookie, an access token, a cryptographic key, a public key token, or a digital certificate.

In any of the disclosed embodiments, the method may further include generating, by the customer-side automated deployment agent and subsequent to using the security credentials during deployment of the computer product instance, new security credentials for the computer product instance.

In another aspect, a disclosed system includes at least one computing device implementing a supplier-side credential management system for performing assigning a unique identifier to a computer product instance to be deployed at a customer site and generating security credentials for the computer product instance dependent on the assigned unique identifier, and at least one computing device implementing a customer-side automated deployment agent for performing obtaining the security credentials for the computer product instance that were generated dependent on the assigned unique identifier and using the security credentials during deployment of the computer product instance.

In yet another aspect, a disclosed non-transitory computer readable memory media stores instructions executable to implement a supplier-side credential management system configured to perform assigning a unique identifier to a computer product instance to be deployed at a customer site and generating security credentials for the computer product instance dependent on the assigned unique identifier, and a customer-side automated deployment agent configured to perform obtaining the security credentials for the computer product instance that were generated dependent on the assigned unique identifier and using the security credentials during deployment of the computer product instance.

BRIEF DESCRIPTION OF THE DRAWINGS

For a more complete understanding of the present disclosure and its features and advantages, reference is now made to the following description, taken in conjunction with the accompanying drawings, in which:

FIG. 5 is a flow diagram illustrating selected elements of a method for establishing security credentials for a computer product instance using a supplier-side credential management system, in accordance with some embodiments;

FIG. 7A and FIG. 7B are flow diagrams illustrating selected elements of respective methods for establishing security credentials for a computer product instance using a shared credential generation program, in accordance with various embodiments.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, an information technology (IT) equipment device, a data center equipment device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

In at least some embodiments, the systems and methods described herein may allow an automated deployment agent at a customer site to obtain security credentials for a computer product instance when it is first deployed, allowing automated zero-touch product deployment without human intervention.

Particular embodiments are best understood by reference to FIGS. 1-7, wherein like numbers are used to indicate like and corresponding parts.

Figure 1:
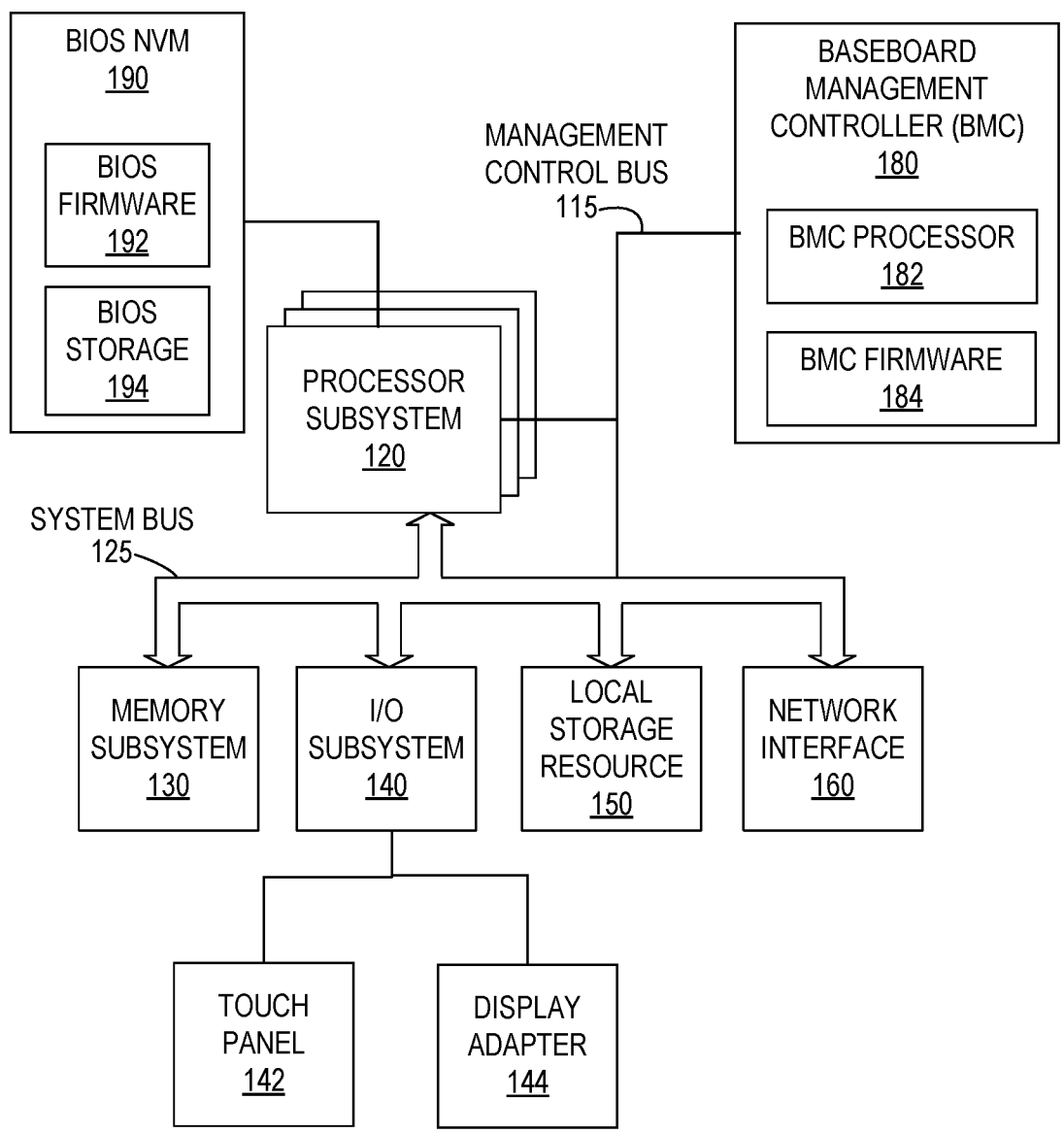
FIG. 1 is a block diagram illustrating selected elements of an embodiment of an information handling system representing a computer product instance to be deployed at a customer site.

Turning now to the drawings, FIG. 1 is a block diagram illustrating selected elements of an embodiment of an information handling system representing a computer product instance to be deployed at a customer site. It is noted that FIG. 1 is not drawn to scale but is a schematic illustration. In some embodiments, information handling system 100 may represent a personal computing device, such as a personal computer system, a desktop computer, a laptop computer, a notebook computer, etc., operated by a user. In other embodiments, information handling system 100 may represent IT or data center equipment, such as a compute server, network switch, router device, storage device, or other computer product to be deployed individually or along with other similar computer products at a data center or other customer site. In some embodiments, information handling system 100 may be or include a compute server, network switch, router device, or storage device to be deployed at an edge location, at a third party location, or at a remote location (such as a radio tower base unit or antenna) on behalf of a customer. In various embodiments, information handling system 100 may be operated by the user using a keyboard and a mouse (not shown), or by a connection made over a network through network interface 160.

As shown in FIG. 1, components of information handling system 100 may include, but are not limited to, a processor subsystem 120, which may comprise one or more processors, and system bus 125 that communicatively couples various system components to processor subsystem 120 including, for example, a memory subsystem 130, an I/O subsystem 140, local storage resource 150, and a network interface 160. System bus 125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network. More specifically, network interface 160 may enable information handling system 100 to communicate over a network (not shown) using a suitable transmission protocol or standard. The network may include, or be part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). In some embodiments, network interface 160 may be communicatively coupled via a network to a network storage resource (not shown). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and/or execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or local storage resource 150). In the same or alternative embodiments, processor subsystem 120 may interpret and execute program instructions and process data stored remotely (e.g., in network storage resources accessed via network interface 160). In some embodiments, a memory subsystem within processor subsystem 120 may include multiple data caches, such as one or more level 1 (L1) caches and/or level 2 (L2) caches (not shown in FIG. 1). For example, a level 1 cache may be local to a particular processor or processor core within processor subsystem 120, and a level 2 cache may be shared between multiple processors or processor cores within a processor subsystem 120. A cache controller within a memory subsystem of processor subsystem 120 may include circuitry to manage the contents of one or more L1 caches and/or L2 caches.

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power is removed. In some embodiments, memory subsystem 130 may include a level 3 (L3) cache or a last-level cache (not shown), which may be shared between processors or processor cores in multiple processor subsystems 120. Local storage resource 150 may comprise computer-readable media (e.g., hard disk drive, floppy disk drive, CD-ROM, and/or other type of rotating storage media, flash memory, EEPROM, or another type of solid state storage media) and may be generally operable to store instructions and data, and to permit access to stored instructions and data on demand. In at least some embodiments, local storage resource 150 may include a collection or array of storage devices and a storage controller.

Also shown in FIG. 1 is non-volatile BIOS memory (BIOS NVM) 190, often simply or collectively referred to as the 'BIOS'. In some embodiments, BIOS NVM memory 190 may be implemented using non-volatile random access memory. As shown, BIOS NVM 190 may include BIOS firmware 192, representing pre-boot instructions executable by processor subsystem 120, for example, for preparing information handling system 100 to boot by activating various hardware components in preparation of launching an operating system for execution. BIOS firmware 192, which may implement the Basic Input/Output System (BIOS) firmware interface, may further include instructions for displaying a user interface (which may also referred to as a BIOS setup program) by which a user may access, modify, and store BIOS user settings. Also shown stored in BIOS NVM 190 is BIOS storage 194, which may represent data, such as program code, settings, data values, etc. that BIOS firmware 192 may store. In some embodiments, BIOS firmware 192 may implement a power-on-self-test when information handling system 100 is powered up or restarted following a shutdown. In certain embodiments, BIOS firmware 192 may have access to network interface 160 for various types of communication, such as with a network administrator. In certain embodiments, at least a portion of BIOS storage 194 may physically reside on a remote storage resource, such as in a network storage resource (not shown). In some embodiments, an interface in compliance with the Unified Extensible Firmware Interface (UEFI) specification may replace the Basic Input/Output System (BIOS) firmware interface in the example embodiment illustrated in FIG. 1. The UEFI specification defines a software interface between an operating system and platform firmware.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In some embodiments, I/O subsystem 140 may comprise a touch panel 142 and a display adapter 144. The touch panel 142 may include circuitry for enabling touch functionality in conjunction with a display device that is driven by the display adapter 144.

In the illustrated embodiment, information handling system 100 also includes a baseboard management controller (BMC) 180. Baseboard management controller 180 includes a BMC processor 182 and BMC firmware 184 that when executed by BMC processor 182 performs the operations of the baseboard management controllers described herein. In at least some embodiments, baseboard management controller 180 may monitor the physical state of information handling system 100 as well as devices included within or coupled to information handling system 100. In some embodiments, baseboard management controller 180 may be configured to perform remote management operations. In some embodiments, baseboard management controller 180 may be configured to provide automatic alerts, to initiate power-on or power cycle events, boot or reboot events, or other power control functions on behalf of information handling system 100.

An enterprise customer, such as a corporation or another type of organization that operates a data center, may, conventionally, rely on their IT department to provision computer products deployed in the data center, such as compute servers, network switches, router devices, storage devices, and/or other computing equipment. This may include configuring and authenticating access rights of various end users while ensuring privacy and enterprise resource security. In general, the term "provisioning," as used herein, may refer to a process of configuring a computer product instance on behalf of a customer or end user(s) for accessing enterprise resources such as, for example, network applications, network services, shared compute resources, shared databases or data repositories, and other resources owned or controlled by the enterprise on behalf of its members or other trusted users and/or configuring an enterprise infrastructure to recognize and allow access to enterprise resources by the customer or end user(s) through computer product instances deployed at the data center. The systems and methods described herein may use a customer-side automated deployment agent to support the provisioning of such computer product instances, reducing reliance on the IT department.

Figure 2:
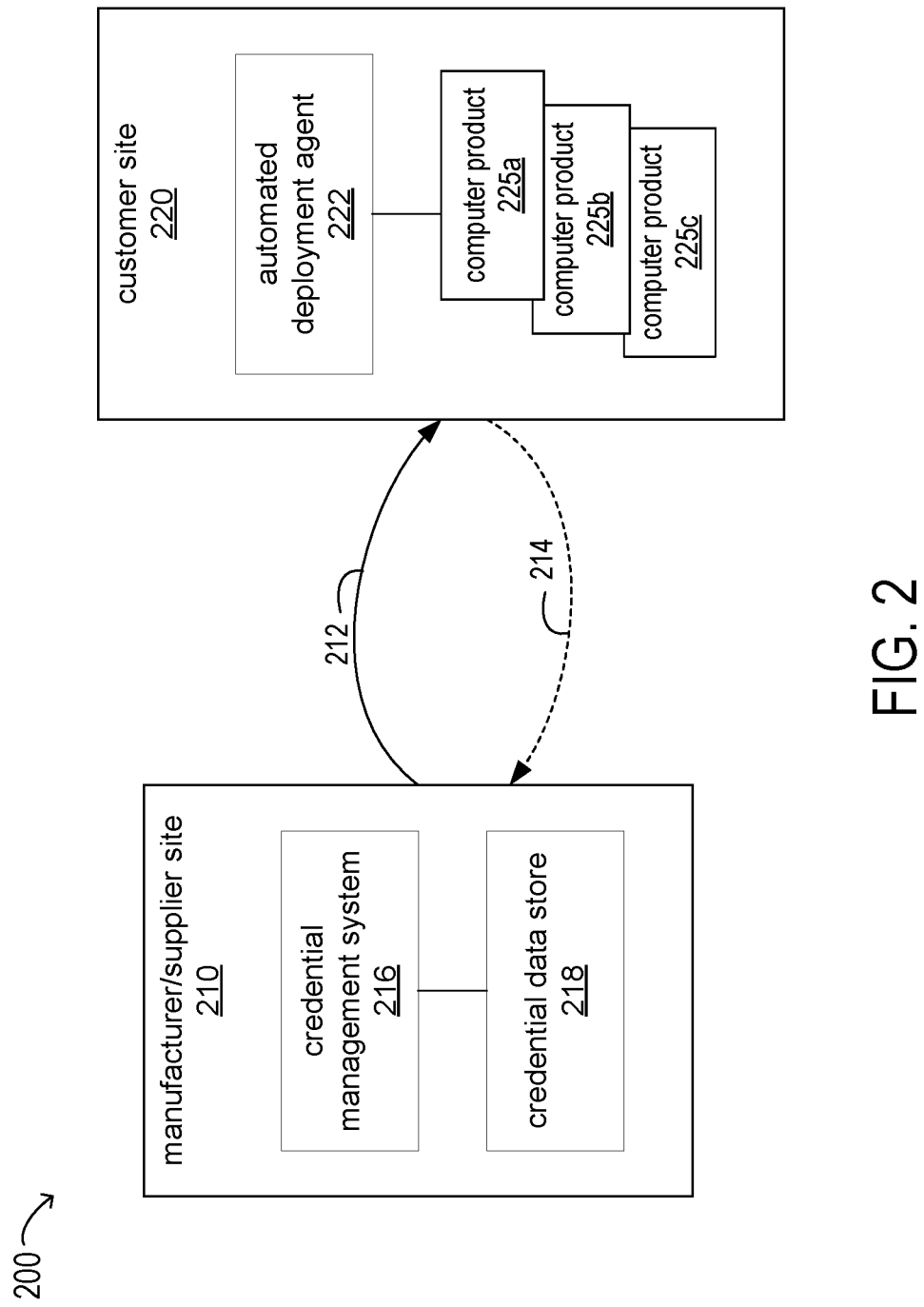
FIG. 2 is a block diagram illustrating selected elements of an embodiment of a system for performing device provisioning using secure credentials for a first deployment.

FIG. 2 is a block diagram illustrating selected elements of an embodiment of a system 200 for performing device provisioning using secure credentials for a first deployment. In the illustrated embodiment, system 200 includes a manufacturer/supplier site 210 and a customer site 220, which comprise separate and distinct geographical locations. Interactions between manufacturer/supplier site 210 and customer site 220 are shown as interactions 212 from manufacturer/supplier site 210 to customer site 220 and interactions 214 from customer site 220 to manufacturer/supplier site 210.

In some embodiments, manufacturer/supplier site 210 may be associated with an entity that manufacturers, integrates, and/or assembles computer products such as IT equipment and/or data center equipment including, for example, compute servers, network switches, router devices, storage devices, and the like. Manufacturer/supplier site 210 may include any geographical location associated with a manufacturing entity or facility that produces such equipment. For example, a manufacturing facility or entity may produce or manufacture, assemble, or integrate computer products such as IT equipment and/or data center equipment at a manufacturing/supplier site 210. Although the example embodiment illustrated in FIG. 2 depicts that the computer products are manufactured by a manufacturing entity located at a site that also includes credential management system 216 for the sake of simplicity, the computer products may be manufactured at any location that is associated with credential management system 216 and is not customer site 220. In some embodiments, manufacturer/supplier site 210 may include a credential management system 216 that is configured to generate, manage, and/or distribute security credentials associated with each computer product instance manufactured, integrated, or assembled by the manufacturing entity and/or at manufacturer/supplier site 210. As used herein, security credentials may include authorization and/or authentication information, such as access usernames, access passwords, access cookies, access tokens, cryptographic keys, such as public key tokens, or other security credential data pertaining to individual computer product instances. In some embodiments, security credentials such as access usernames, access passwords, or access tokens may include random and unique combinations of letters, numbers, and/or punctuation symbols.

Credential management system 216 may include at least one physical computer machine that comprises at least one processor and at least one memory (not shown). In some embodiments, the processor may include a microprocessor, a central processing unit (CPU), or any other like hardware-based processor unit. In some embodiments, credential management system 216 may host a credential management module (CMM) in the memory, which may include random access memory (RAM), read only memory (ROM), optical read/write memory, cache memory, magnetic read/write memory, flash memory, or any other non-transitory computer readable medium. Notably, the processor and memory in credential management system 216 can be used to execute and facilitate the operation of the CMM, as described herein. In some embodiments, credential management system 216 may comprise a special purpose credential management server provisioned with the CMM. In some embodiments, the CMM may be provisioned on and/or executed by a physical computer machine that is separate and independent from credential management system 216. In some embodiments, credential management system 216 may include an online Credential Management Service (CMS), through which security credentials may be retrieved by authorized users.

Credential management system 216 may be communicatively linked to a credential data store 218. In some embodiments, credential management system 216 may be configured to generate a log that records any attempt/request to access credential data store 218. Further, credential management system 216 may be configured to eliminate all access by and authorization of a requesting entity after a predefined number of unsuccessful access attempts conducted by a requesting entity. In some embodiments, credential data store 218 may comprise a secure database server, a manufacturing vault, or other secured data store device, which may be configured to store security credentials (e.g., unique username and password combinations, access cookies, access tokens, cryptographic keys, digital certificates, etc.). For example, credential data store 218 may comprise any data storage unit (e.g., a database or plurality of databases) that can be configured to function as a centralized credential storage unit for credential management system 216. In some embodiments, credential data store 218 may be configured to store credential information related to the equipment manufactured by a particular manufacturing entity and the security credentials contained in credential data store 218 may be accessed and obtained by credential management system 216 and/or the CMM for provisioning of this equipment. Although FIG. 2 depicts credential data store 218 as a local data storage unit residing at manufacturer/supplier site 210, credential data store 218 can also be embodied as a data storage unit located at a non-local distributed content site, on a local proxy server, or on a different network without departing from the scope of the disclosed subject matter. As such, credential data store 218 may be located within and hosted by credential management system 216. In various embodiments, credential data store 218 may comprise any storage medium or storage unit that is configured to store data accessible by the processor of credential management system 216 either via system bus or a local network connection.

Customer site 220 may include any geographical site in which a customer's network infrastructure is located and at which multiple computer product instances 225 are being deployed. In some embodiments, each computer product instance 225 may be an information handling system such as information handling system 100 illustrated in FIG. 1. In other embodiments, various computer product instances 225 may be information handling systems including more, fewer, or different elements than those of information handling system 100 illustrated in FIG. 1. Although FIG. 2 only depicts a single customer location site, it is understood that system 200 may include additional customer location sites that respectively contain any number of additional computer product instances without departing from the scope of the disclosed subject matter. In some embodiments, each computer product instance 225 may represent an individual piece of IT or data center equipment, such as a compute server, network switch, router device, or storage device, which is operated within a data center or other customer facility. In some embodiments, each computer product instance 225 may represent an individual piece of equipment, such as a compute server, network switch, router device, or storage device that is deployed at an edge location, at a third party location, or at a remote location, such as a radio tower base unit or antenna, on behalf of a customer. In the illustrated embodiment, customer site 220 includes an automated deployment agent 222 that is, at certain times and under certain circumstances, communicatively coupled to one or more computer product instances 225. Automated deployment agent 222 may include at least one physical computer machine that comprises at least one processor and at least one memory (not shown). In some embodiments, the processor may include a microprocessor, a central processing unit (CPU), or any other like hardware-based processor unit. The memory may include random access memory (RAM), read only memory (ROM), optical read/write memory, cache memory, magnetic read/write memory, flash memory, or any other non-transitory computer readable medium. Notably, the processor and memory in automated deployment agent 222 can be used to execute and facilitate the operation of automated deployment agent 222, as described herein.

In some embodiments, customer site 220 may include one or more host devices, such as a converged infrastructure (CI) system (not shown in FIG. 2). As used herein, a CI system, such as a VxBlock® System or VxRail developed by VCE Company, LLC, may include multiple computer product instances 225, such as multiple pieces of IT or data center equipment or components in a preconfigured or prepackaged computing platform. For example, a host device can include a single computing platform unit associated with racks of physical pieces of equipment and related software for performing virtualization and/or other IT or data center functions. In some embodiments, the equipment or components associated with a host device may include a compute component, a software component, a networking component, a hardware component, or a firmware component. For example, a host device may include data storage devices, compute devices (e.g., a unified computing system device), networking equipment (e.g., switch devices), and software for managing physical resources and/or virtualized resources (e.g., virtual servers).

In some embodiments, credential management system 216 residing in manufacturer/supplier site 210 may be communicatively coupled to automated deployment agent 222 residing in customer site 220 via a communications network, such as the Internet, that facilitates the communication of signals or messages between credential management system 216 and automated deployment agent 222 (not shown in FIG. 2). As described in more detail below, in some embodiments, credential management system 216 may be configured to generate individual security credentials for each computer product instance 225 based at least on a unique identifier of the computer product instance.

It will be appreciated that FIG. 2 illustrates an exemplary embodiment and that various devices, their locations, and/or their functions as described above in relation to FIG. 2 may be changed, altered, added, or removed.

In at least some embodiments of the present disclosure, a computer product instance to be deployed at a customer site may be assigned a unique identifier and security credentials may be generated specifically for that computer product instance based, at least in part, on the unique identifier of the computer product instance. In some embodiments, the assigned identifier may include, or be based on, an identifier of a hardware or software component of the computer product instance. For example, the assigned identifier may include, or be based on, a model number of the device or a constituent component thereof, a serial number of the device or a constituent component thereof, an asset tag associated with the device or a constituent component thereof, a media access control (MAC) address of the device, or a combination (e.g., a concatenation) of two or more such identifiers. In other embodiments, the assigned identifier may include a randomly generated alphanumeric identifier that is generated or selected at the supplier site, either manually or automatically. In still other embodiments, the assigned identifier may include a randomly generated alphanumeric identifier that is generated or selected at the customer site, either manually or automatically. In some embodiments, the assigned identifier may be mutually agreed upon by the manufacturer or supplier and the customer. The assigned identifier may be provided to credential management system by a system administrator. Alternatively, credential management system may be configured to generate the assigned identifier for devices manufactured at a facility associated with the credential management system. In some embodiments, the security credentials for an individual computer product instance may be generated based on the unique identifier assigned to the computer product and on infrastructure access information associated with the user. In various embodiments, the infrastructure access information associated with the user may include one or more of an identifier of the customer or user, account information associated with the customer or user, information identifying an access portal of the enterprise infrastructure, and an enterprise login credential for the customer or user. In some embodiments, generating the security credentials may be further dependent on information indicating a configuration of the computer product instance, such as a Stock Keeping Unit (SKU) for the computer product instance. In some embodiments, generating the security credentials may include encoding, or otherwise embedding, the unique identifier of the computer product instance, the infrastructure access information associated with the user, and/or the configuration information in the security credentials, such as within a digital certificate.

In various embodiments, the security credentials generated for an individual computer product instance may include an access username, an access password, an access cookie, an access token, a cryptographic key, a public key token, or a digital certificate, among other possibilities. In some embodiments, the security credentials may be communicated to a supplier-side administrative user and may be stored in a supplier-side credential data store. In other embodiments, the security credentials may be automatically populated in the credential data store without being provided to a supplier-side administrative user. In either case, however, rather than the manufacturer/supplier communicating the security credentials to the customer via a secure, out-of-band channel, as in some earlier systems, a customer-side automated deployment agent may obtain the security credentials based on the unique identifier assigned to the computer product instance using one of several approaches, including those described below. The security credentials may subsequently be used by the automated deployment agent during deployment of the computer product instance, e.g., for a first login to an operating system executing on the computer product instance, a first login to application software executing on the computer product instance, a first login to a management environment executing on the computer product instance, or a first login to a baseboard management controller (BMC) of the computer product instance. For example, the automated deployment agent may use the security credentials to authenticate against the computer product instance and perform the initial deployment, which may include assigning new credentials for the computer product instance.

Figure 3:
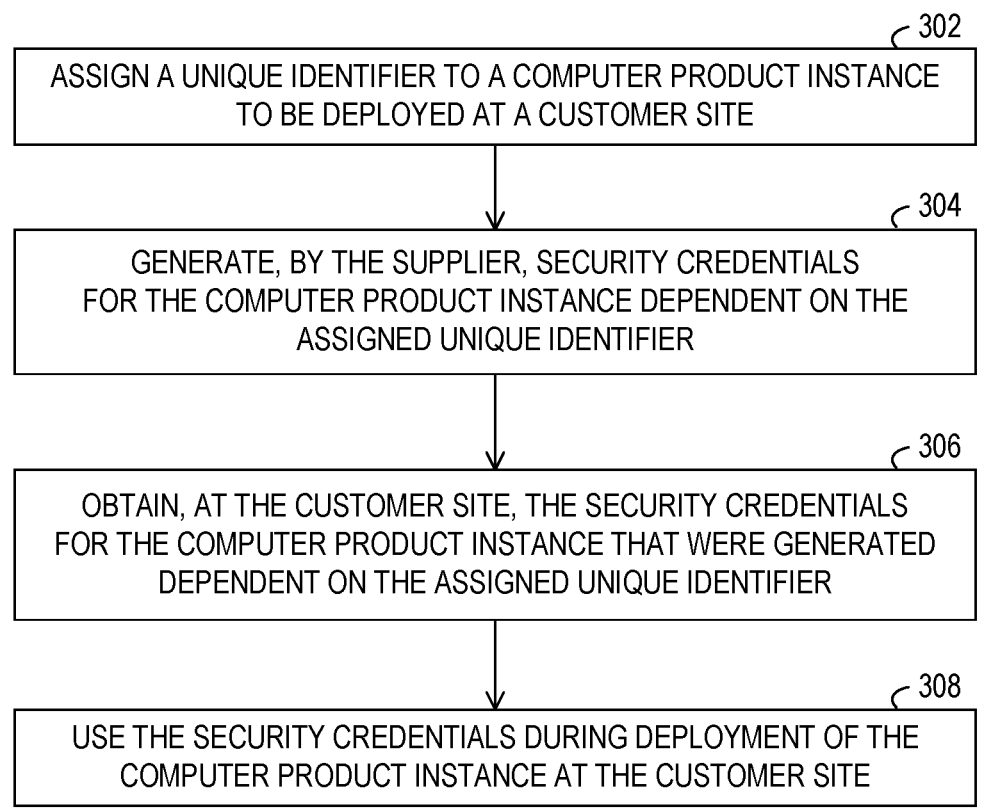
FIG. 3 is a flow diagram illustrating selected elements of a method for performing device provisioning using secure credentials for a first deployment.

Referring now to FIG. 3, selected elements of an embodiment of a method 300 for performing device provisioning using secure credentials for a first deployment, as described herein, are depicted in flowchart form. In certain embodiments, one or more operations of method 300 may be performed by a supplier-side credential management system, such as credential management system 216 illustrated in FIG. 2, or by a customer-side automated deployment agent, such as automated deployment agent 222 illustrated in FIG. 2. In some embodiments, method 300 may be performed once for each computer product instance when it is deployed and may not execute successfully if execution is attempted a second time. It is noted that certain operations described in method 300 may be optional or may be rearranged in different embodiments.

Method 300 may begin, at 302, with assigning a unique identifier to a computer product instance to be deployed at a customer site. In at least some embodiments, the computer product instance may be an information handling system such as information handling system 100 illustrated in FIG. 1. In other embodiments, the computer product instance may be an information handling system including more, fewer, or different elements than those of information handling system 100 illustrated in FIG. 1. As described in more detail herein, the unique identifier may be or include a unique identifier of a hardware or software component of the information handling system or may be selected by the manufacturer/supplier or customer.

The method may include, at 304, generating, by the supplier, security credentials for the computer product instance (e.g., an access username, an access password, an access cookie, an access token, a cryptographic key, a public key token, or a digital certificate) dependent on the assigned unique identifier. In some embodiments, generating the security credentials may include a supplier-side credential management system generating the security credentials and the supplier-side credential management system storing the security credentials. In some embodiments, generating the security credential may include generating the security credentials using a shared credential generation program. For example, the shared credential generation program may use the unique identifier of the computer product instance as a seed for the generation of the security credentials for the computer product instance.

At 306, method 300 may include obtaining, at the customer site, the security credentials for the computer product instance that were generated dependent on the assigned unique identifier. For example, in some embodiments, obtaining the security credentials may include a customer-side automated deployment agent requesting and receiving the security credentials from a supplier-side credential management system over a secure communication channel. In other embodiments, the method may include a supplier-side credential management system providing a shared credential generation program to a customer-side automated deployment agent and obtaining the security credentials may include the customer-side automated deployment agent generating the security credentials using the shared credential generation program.

At 308, the method may include using the security credentials during deployment of the computer product instance at the customer site, e.g., for a first login to an operating system executing on the computer product instance, a first login to application software executing on the computer product instance, a first login to a management environment executing on the computer product instance, or a first login to a baseboard management controller (BMC) of the computer product instance.

In some embodiments, the unique identifier of the computer product instance may be saved with the security credentials generated for the computer product instance in a credential data store, such as credential data store 218 illustrated in FIG. 2, along with an identifier of the customer or end-user to whom the computer product instance is to be shipped. The customer identifier and unique identifier may then be used as the key into the credential data store to retrieve the security credentials for a first login during deployment of the computer product instance. For example, in some embodiments, a customer-side automated deployment agent may be configured to obtain the security credentials through an online Credential Management Service (CMS) of credential management system 216 illustrated in FIG. 2. In some embodiments, remote access to the CMS by the customer-side automated deployment agent may be enabled using a username associated with the customer identifier and a rotating password system. Successful authentication may provide the automated deployment agent with an ability to query the CMS, using the customer identifier and the unique identifier of the computer product instance as the query key, and to receive the security credentials for the computer product instance in return. In some embodiments, unauthorized actors may be unable to query the CMS using identifiers of computer product instances that are not associated with the correct customer identifiers. In some embodiments, the security credentials may be encrypted with a public key that can only be decrypted using a private key held by the customer. Other mechanisms may be used to obtain the security credentials from a supplier-side credential management system, or credential data store thereof, in different embodiments.

Figure 4:
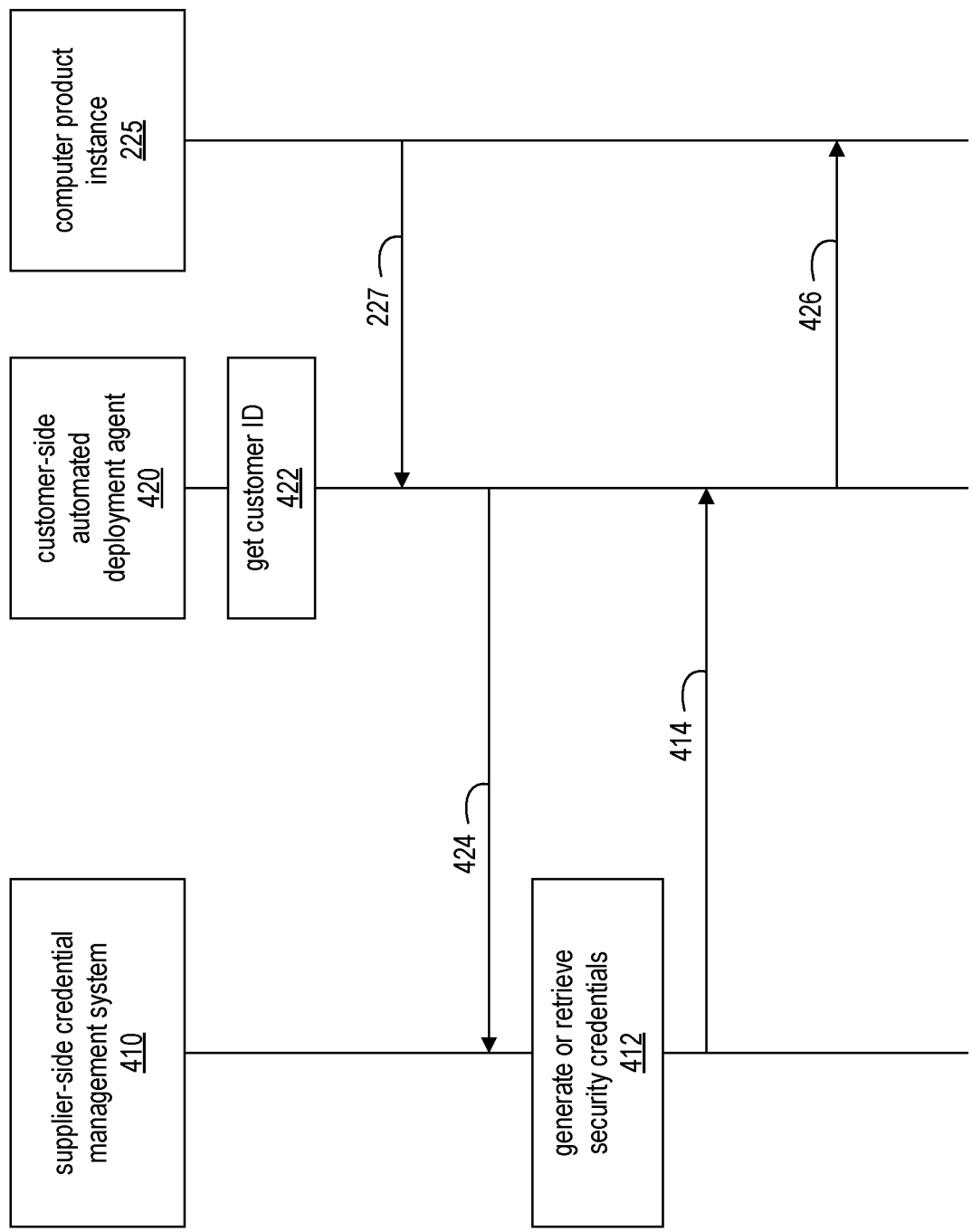
FIG. 4 illustrates signaling communications and other interactions for establishing security credentials for a computer product instance using a supplier-side credential management system, in accordance with some embodiments.

FIG. 4 illustrates signaling communications and other interactions for establishing security credentials for a computer product instance using a supplier-side credential management system, in accordance with some embodiments. In FIG. 4, signaling communications and other actions/interactions are shown substantially in timeline order from top to bottom. In the illustrated embodiment, supplier-side credential management system 410 may be operated at, or on behalf of, a manufacturer or supplier of computer product instances and customer-side automated deployment agent 420 may be operated at, or on behalf of, a customer site at which computer product instances, such as the particular computer product instance 225 shown in FIG. 4, are deployed. In some embodiments, computer product instance 225 may be an information handling system such as information handling system 100 illustrated in FIG. 1. In other embodiments, computer product instance 225 may be an information handling system including more, fewer, or different elements than those of information handling system 100 illustrated in FIG. 1.

In the illustrated embodiment, element 422 represents an action to assign or obtain (e.g., from a memory associated with automated deployment agent 420) a customer or user identifier associated with the particular computer product instance 225. Element 227 represents an interaction in which automated deployment agent 420 receives or retrieves a unique identifier of the computer product instance 225 from the computer product instance itself. For example, automated deployment agent 420 may query configuration data stored on computer product instance 225 to retrieve a unique identifier for the computer product instance. In the embodiment illustrated in FIG. 4, it is assumed that the computer product instance has already been shipped to, and received at, the customer site at this point.

In the illustrated embodiment, element 424 represents an interaction in which automated deployment agent 420 provides an authentication credential of the customer or user (such as a customer or user identifier and any additional credential component(s) necessary to authenticate and secure the transaction) and the unique identifier of computer product instance 225 to credential management system 410 over a secure communication channel. Subsequently, credential management system 410 may generate security credentials (e.g., an access username, an access password, an access cookie, an access token, a cryptographic key, a public key token, or a digital certificate) for computer product instance 225, as shown at element 412, or may retrieve the security credentials for computer product instance 225 from credential data store 218, e.g., in embodiments in which the security credentials were generated when the equipment was manufactured and were stored in the credential data store 218 at that time. Element 414 represents an interaction in which automated deployment agent 420 receives the security credentials for computer product instance 225 from credential management system 410 over a secure communication channel. Finally, element 426 represents an interaction in which automated deployment agent 420 uses the security credentials for a first login to computer product instance 255 during deployment of the computer product instance.

Referring now to FIG. 5, selected elements of an embodiment of a method 500 for establishing security credentials for a computer product instance using a supplier-side credential management system, as described herein, are depicted in flowchart form. In certain embodiments, one or more operations of method 500 may be performed by a supplier-side credential management system, such as credential management system 216 illustrated in FIG. 2, or by a customer-side automated deployment agent, such as automated deployment agent 222 illustrated in FIG. 2. In some embodiments, method 500 may be performed once for each computer product instance when it is deployed and may not execute successfully if execution is attempted a second time. It is noted that certain operations described in method 500 may be optional or may be rearranged in different embodiments.

Method 500 may begin, at 502, with a customer-side automated deployment agent assigning or otherwise obtaining a customer identifier for a particular computer product instance to be deployed at a customer site. The customer identifier may be specific to a particular end user, in some embodiments. In some embodiments, the computer product instance may be an information handling system such as information handling system 100 illustrated in FIG. 1. In other embodiments, the computer product instance may be an information handling system including more, fewer, or different elements than those of information handling system 100 illustrated in FIG. 1.

At 504, the method may include the customer-side automated deployment agent obtaining (e.g., from memory coupled to customer-side deployment agent or from the computer product instance itself) a unique identifier for the computer product instance. As described herein, the unique identifier may be or include a unique identifier of a hardware or software component of the information handling system or may be selected by the manufacturer/supplier and/or customer.

At 506 method 500 may include the customer-side automated deployment agent providing an authentication credential of the customer (such as a customer identifier and any additional credential component(s) necessary to authenticate and secure the transaction) and the unique identifier for the computer product instance to a credential management system at a supplier site over a secure communication channel.

At 508, the method may include the credential management system generating security credentials for the computer product instance based on the customer identifier and the assigned unique identifier of the computer product instance or retrieving the security credentials for the computer product instance from a credential data store. The security credentials may be or include one or more of an access username, an access password, an access cookie, an access token, a cryptographic key, a public key token, or a digital certificate, in various embodiments.

At 510, the method may include the customer-side automated deployment agent retrieving the security credentials from the credential management system over the secure communication channel using the customer identifier and the unique identifier of the computer product instance. For example, the customer-side automated deployment agent may send a query to the credential management system that includes the customer identifier and the unique identifier and may receive a reply including the security credentials for the computer product instance.

At 512, method 500 may include the customer-side automated deployment agent using the security credentials to log into the computer product instance and to complete deployment. For example, the security credentials may be used for a first login to an operating system executing on the computer product instance, a first login to application software executing on the computer product instance, a first login to a management environment executing on the computer product instance, or a first login to a baseboard management controller (BMC) of the computer product instance.

At 514, the method may include the customer-side automated deployment agent generating new security credentials for the computer product instance subsequent to completion of deployment.

In some embodiments, rather than retrieving security credentials for a particular computer product instance from a supplier-side credential management system, a customer-side automated deployment agent may obtain the security credentials for a first login during deployment based on credential generation program that is shared between the manufacturer/supplier and a customer on behalf of which multiple computer product instances are deployed at a customer site. In some such embodiments, the security credentials might or might not be stored in a credential data store through which they are available to the customer-side automated deployment agent. Instead, the customer-side automated deployment agent may regenerate the security credentials for each computer product instance, based at least on a unique identifier of the computer product instance, at the customer site when needed. For example, the shared credential generation program may use the unique identifier of the computer product instance as a seed for the generation of the security credentials for the computer product instance. After generating the security credentials at the customer site, the customer-side automated deployment agent may use those security credentials to authenticate against the computer product instance.

Figure 6A:
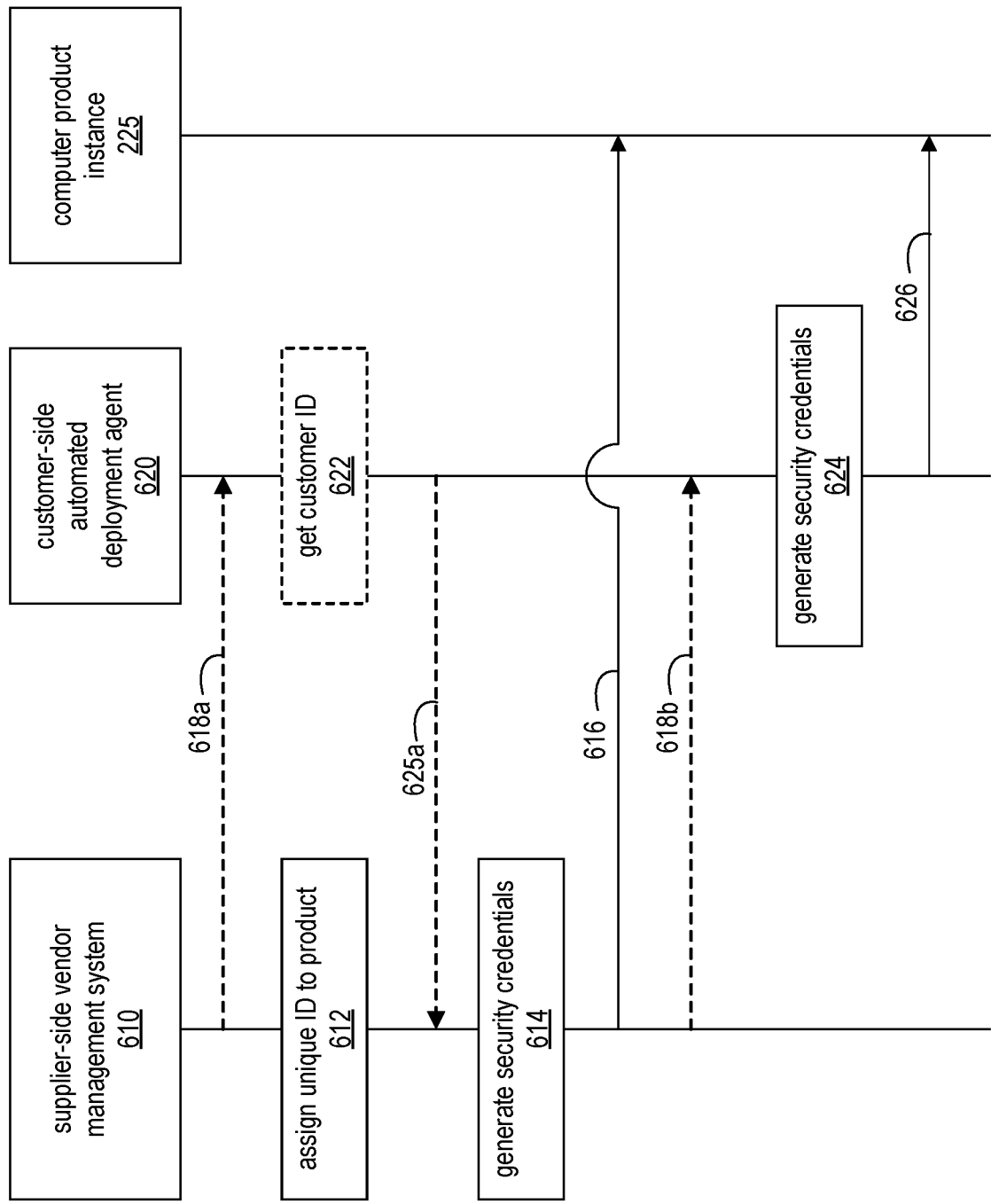
FIG. 6A and FIG. 6B illustrate signaling communications and other interactions for establishing security credentials for a computer product instance using a shared credential generation program, in accordance with various embodiments.
Figure 6B:
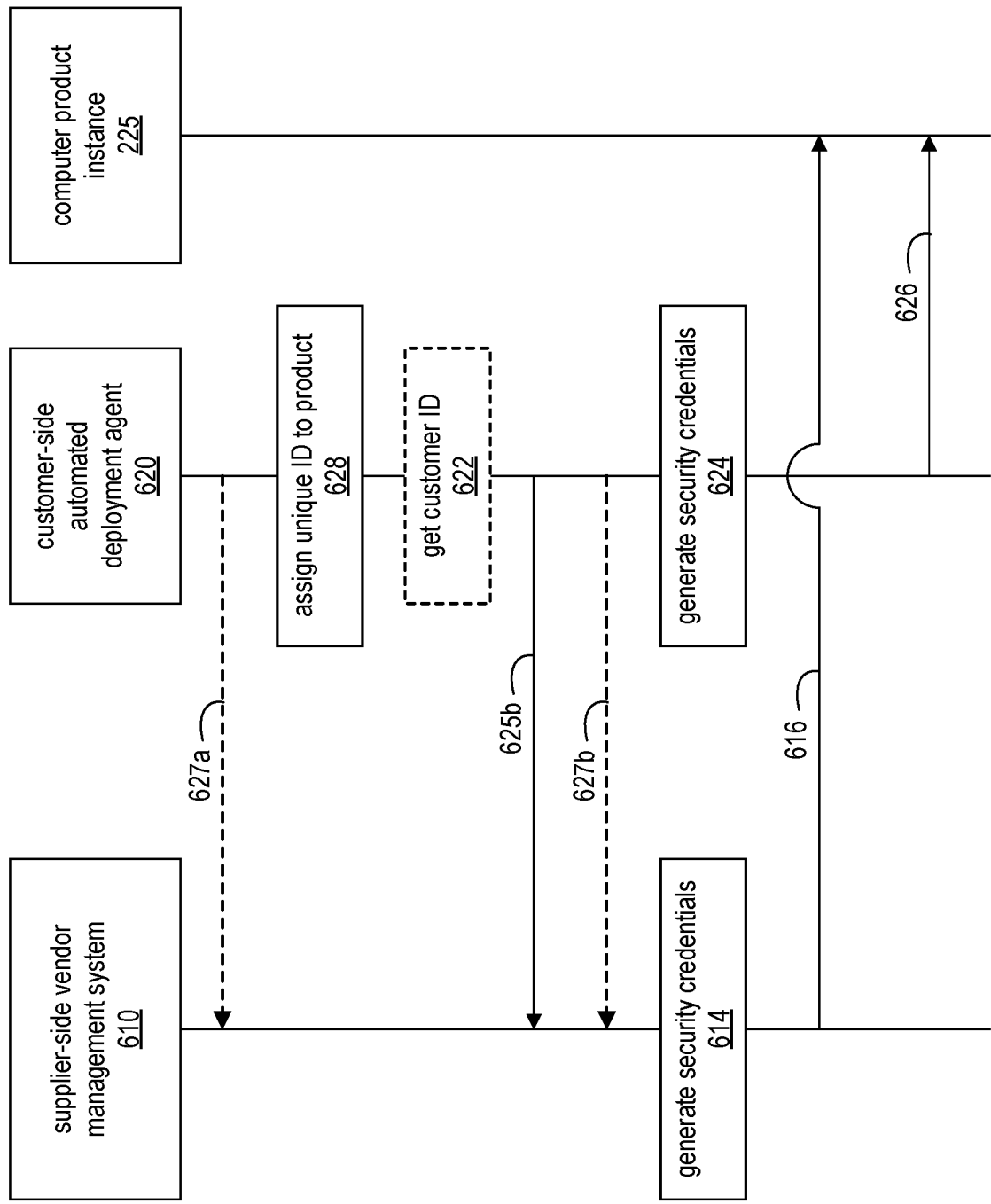

FIG. 6A and FIG. 6B illustrate signaling communications and other interactions for establishing security credentials for a computer product instance using a shared credential generation program, in accordance with various embodiments. For example, FIG. 6A illustrates signaling communications and other interactions for establishing security credentials for a computer product instance using a shared credential generation program in an embodiment which the shared credential generation program is provided by a supplier-side vendor management system to a customer-side automated deployment agent. In FIG. 6A, signaling communications and other actions/interactions are shown substantially in timeline order from top to bottom. In the illustrated embodiment, supplier-side vendor management system 610 may be operated at, or on behalf of, a manufacturer or supplier of computer product instances and customer-side automated deployment agent 620 may be operated at, or on behalf of, a customer site at which computer product instances, such as the particular computer product instance 225 shown in FIG. 6A, are deployed. In some embodiments, computer product instance 225 may be an information handling system such as information handling system 100 illustrated in FIG. 1. In other embodiments, computer product instance 225 may be an information handling system including more, fewer, or different elements than those of information handling system 100 illustrated in FIG. 1.

In the illustrated embodiment, element 612 represents an action in which the supplier-side vendor management system assigns a unique identifier to a computer product instance 225 to be deployed by a customer. As described herein, the unique identifier may be or include a unique identifier of a hardware or software component of the information handling system or may be selected by the manufacturer/supplier and/or customer. In some embodiments, computer product instance 225 may be an information handling system such as information handling system 100 illustrated in FIG. 1. In other embodiments, computer product instance 225 may be an information handling system including more, fewer, or different elements than those of information handling system 100 illustrated in FIG. 1.

In the illustrated embodiment, element 622 represents an optional action to obtain (e.g., from a memory associated with automated deployment agent 620) a customer or user identifier associated with the particular computer product instance 225. The actions shown in elements 612 and 622 may be performed substantially simultaneously or in any order with respect to each other, in various embodiments. In embodiments that include obtaining the customer or user identifier, optional element 625a represents an interaction to provide the customer or user identifier to supplier-side vendor management system 610 over a secure communication channel.

Element 614 represents an action in which supplier-side vendor management system 610 generates security credentials for computer product instance 225 (e.g., an access username, an access password, an access cookie, an access token, a cryptographic key, a public key token, or a digital certificate) using a shared credential generation program based on the unique identifier of computer product instance 225 and (optionally) the customer or user identifier associated with the computer product instance.

Element 616 represents an interaction in which the manufacturer/supplier ships computer product instance 225 to the customer site including the unique identifier of computer product instance 225. Two elements 618 represent an interaction in which supplier-side vendor management system 610 provides the shared credential generation program to customer-side automated deployment agent 620 over a secure communication channel, according to different embodiments. For example, in some embodiments, supplier-side vendor management system 610 may provide the shared credential generation program to customer-side automated deployment agent 620 prior to shipping the computer product instance to the customer site, as shown at element 618a. In other embodiments, supplier-side vendor management system 610 may provide the shared credential generation program to customer-side automated deployment agent 620 subsequent to shipping the computer product instance to the customer site, as shown at element 618b.

Element 624 represents an action in which customer-side automated deployment agent 620 regenerates the security credentials for computer product instance 225 (e.g., the access username, access password, access cookie, access token, cryptographic key, public key token, or digital certificate) based on the unique identifier of computer product instance 225 and (optionally) the customer or user identifier using shared credential generation program.

Finally, element 626 represents an interaction in which customer-side automated deployment agent 620 uses the security credentials for a first login to computer product instance 255 during deployment of the computer product instance. For example, the security credentials may be used for a first login to an operating system executing on computer product instance 225, a first login to application software executing on computer product instance 225, a first login to a management environment executing on computer product instance 225, or a first login to a baseboard management controller (BMC) of computer product instance 225.

FIG. 6B illustrates signaling communications and other interactions for establishing security credentials for a computer product instance using a shared credential generation program in an embodiment which the shared credential generation program is provided to a supplier-side vendor management system by a customer-side automated deployment agent. In FIG. 6B, signaling communications and other actions/interactions are shown substantially in timeline order from top to bottom. In the illustrated embodiment, supplier-side vendor management system 610 may be operated at, or on behalf of, a manufacturer or supplier of computer product instances and customer-side automated deployment agent 620 may be operated at, or on behalf of, a customer site at which computer product instances, such as the particular computer product instance 225 shown in FIG. 6B, are deployed. In some embodiments, computer product instance 225 may be an information handling system such as information handling system 100 illustrated in FIG. 1. In other embodiments, computer product instance 225 may be an information handling system including more, fewer, or different elements than those of information handling system 100 illustrated in FIG. 1.

In the illustrated embodiment, two elements 627 represent an interaction in which customer-side automated deployment agent 620 provides a shared credential generation program to supplier-side vendor management system 610 over a secure communication channel, according to different embodiments. For example, in some embodiments, customer-side automated deployment agent 620 may provide the shared credential generation program to supplier-side vendor management system 610 once prior to any computer product instances 225 to be deployed at the customer site being shipped to, or received at, the customer site, as shown at element 627*a*. In other embodiments, customer-side automated deployment agent 620 may provide a shared credential generation program to supplier-side vendor management system 610 once for each computer product instance 225 being shipped to the customer site (as shown at element 627*b*) or once per order (irrespective of the number of computer product instances in the order) prior to shipping. In other words, each computer product instance 225 may be under the control of the manufacturer/supplier until security credentials have been generated and applied to the computer product instance by the manufacturer/supplier, after which it may be shipped to the customer. Element 616 represents an interaction in which the manufacturer/supplier ships computer product instance 225 to the customer site.

In the illustrated embodiment, element 628 represents an action in which the customer-side automated deployment agent 620 assigns a unique identifier to the particular computer product instance 225. As described herein, the unique identifier may be or include a unique identifier of a hardware or software component of the information handling system or may be selected by the customer. In other embodiments, the unique identifier may be selected or assigned by the manufacture/supplier or may be mutually agreed upon by the manufacturer/supplier and the customer. In embodiments in which the unique identifier of computer product instance 225 is selected or assigned by the manufacturer/supplier, the unique identifier may be provided to the customer when computer product instance 225 is shipped to the customer site. In some embodiments, computer product instance 225 may be an information handling system such as information handling system 100 illustrated in FIG. 1. In other embodiments, computer product instance 225 may be an information handling system including more, fewer, or different elements than those of information handling system 100 illustrated in FIG. 1.

In the illustrated embodiment, element 622 represents an optional action to obtain (e.g., from a memory associated with automated deployment agent 620) a customer or user identifier associated with the particular computer product instance 225. In various embodiments, element 625*b* may represent an interaction to provide the unique identifier of computer product instance 225 and/or the customer or user identifier to supplier-side vendor management system 610 over a secure communication channel, e.g., in embodiments that include obtaining the customer or user identifier.

Element 614 represents an action in which supplier-side vendor management system 610 generates security credentials for computer product instance 225 (e.g., an access username, an access password, an access cookie, an access token, a cryptographic key, a public key token, or a digital certificate) using a shared credential generation program based on the unique identifier of computer product instance 225 and (optionally) the customer or user identifier associated with the computer product instance.

Element 624 represents an action in which customer-side automated deployment agent 620 regenerates the security credentials for computer product instance 225 (e.g., the access username, access password, access cookie, access token, cryptographic key, public key token, or digital certificate) based on the unique identifier of computer product instance 225 and (optionally) the customer or user identifier using shared credential generation program. The actions shown in elements 614 and 624 may be performed substantially simultaneously or in any order with respect to each other, in various embodiments.

Finally, element 626 represents an interaction in which customer-side automated deployment agent 620 uses the security credentials for a first login to computer product instance 255 during deployment of the computer product instance. For example, the security credentials may be used for a first login to an operating system executing on computer product instance 225, a first login to application software executing on computer product instance 225, a first login to a management environment executing on computer product instance 225, or a first login to a baseboard management controller (BMC) of computer product instance 225.

Figure 7A:
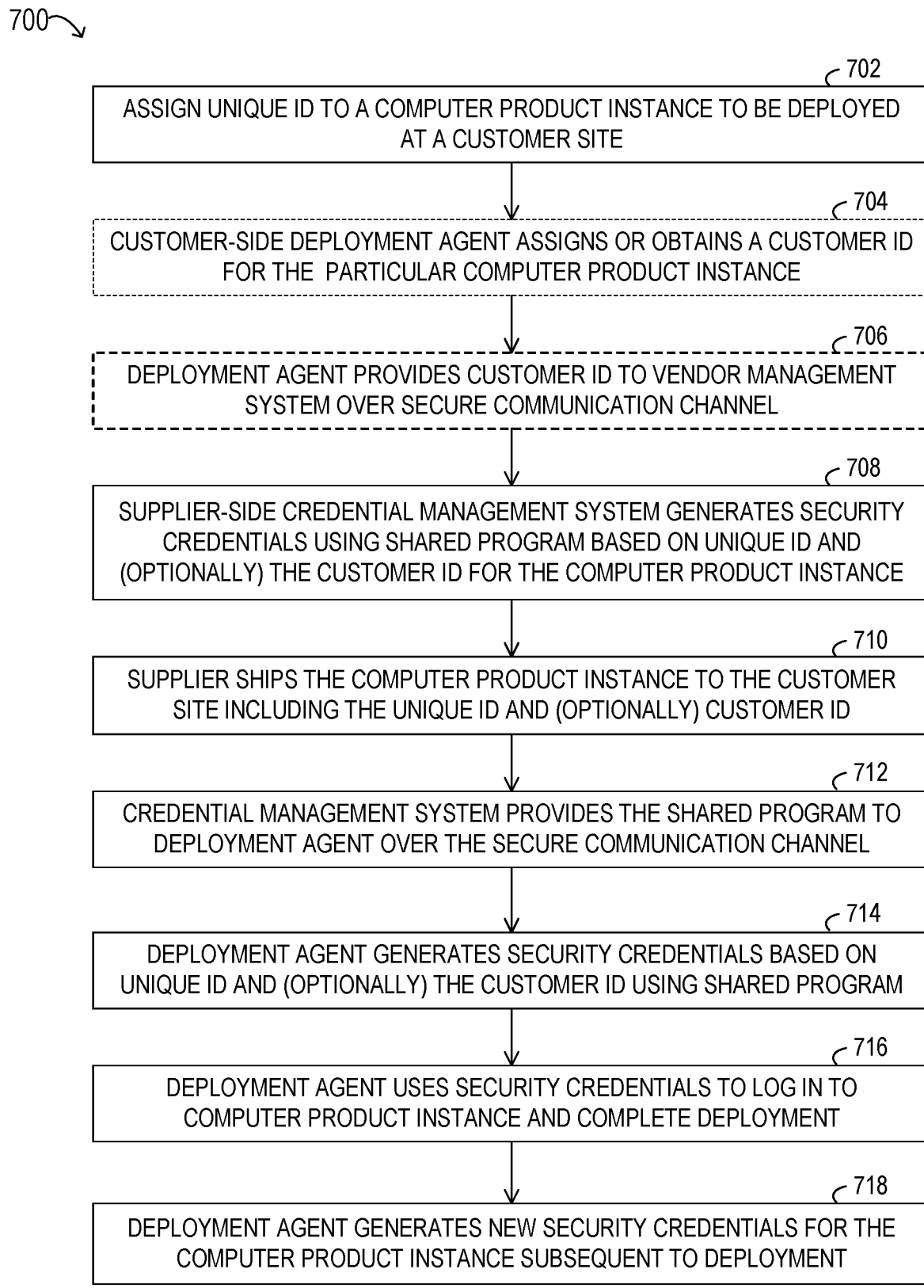

FIG. 7A and FIG. 7B are flow diagrams illustrating selected elements of respective methods for establishing security credentials for a computer product instance using a shared credential generation program, in accordance with various embodiments. Referring now to FIG. 7A, selected elements of an embodiment of a method 700 for establishing security credentials for a computer product instance using a shared credential generation program, in which the shared credential generation program is provided by a supplier-side vendor management system to a customer-side automated deployment agent, are depicted in flowchart form. In certain embodiments, one or more operations of method 700 may be performed by a supplier-side credential management system, such as credential management system 216 illustrated in FIG. 2, or by a customer-side automated deployment agent, such as automated deployment agent 222 illustrated in FIG. 2. In some embodiments, method 700 may be performed once for each computer product instance when it is deployed and may not execute successfully if execution is attempted a second time. It is noted that certain operations described in method 700 may be optional or may be rearranged in different embodiments.

Method 700 may begin, at 702, with assigning a unique identifier to a computer product instance to be deployed by a customer. In various embodiments, the assignment of the unique identifier may be performed by the customer, by the supplier, or by mutual agreement between the customer and supplier. As described herein, the unique identifier may be or include a unique identifier of a hardware or software component of the information handling system or may be selected by the manufacturer/supplier and/or customer.

At 704, method 700 may (optionally) include the customer-side automated deployment agent assigning or obtaining a customer identifier associated with the particular computer product instance. In some embodiments, the customer identifier may be obtained from a memory accessible by the automated deployment agent. The customer identifier may be specific to a particular end user, in some embodiments. At 706, the method may (optionally) include the customer-side automated deployment agent providing the customer identifier to a supplier-side vendor management system over a secure communication channel.

At 708, method 700 may include a supplier-side credential management system generating security credentials (e.g., an access username, an access password, an access cookie, an access token, a cryptographic key, a public key token, or a digital certificate) using a shared credential generation program based on the unique identifier of the computer product instance and (optionally) the customer identifier associated with the computer product instance.

At 710, method 700 may include the supplier shipping the computer product instance to the customer site including the unique identifier of the computer product instance. At 712, the method may include the supplier-side credential management system providing the shared credential generation program to the customer-side automated deployment agent over the secure communication channel. Note that in other embodiments, the supplier-side credential management system may provide the shared credential generation program to the customer-side automated deployment agent prior to shipping the computer product instance to the customer site, as shown at 618a in FIG. 6A.

At 714, method 700 may include the customer-side automated deployment agent generating or, more specifically, regenerating the security credentials for the computer product instance (e.g., the access username, access password, access cookie, access token, cryptographic key, public key token, or digital certificate) based on the unique identifier of the computer product instance and (optionally) the customer identifier associated with the computer product instance using the shared credential generation program.

At 716, the method may include the customer-side automated deployment agent using the security credentials to log into the computer product instance and to complete deployment. For example, the security credentials may be used for a first login to an operating system executing on the computer product instance, a first login to application software executing on the computer product instance, a first login to a management environment executing on the computer product instance, or a first login to a baseboard management controller (BMC) of the computer product instance.

At 718, method 700 may include the customer-side automated deployment agent generating new security credentials for the computer product instance subsequent to completion of deployment.

Referring now to FIG. 7B, selected elements of an embodiment of a method 750 for establishing security credentials for a computer product instance using a shared credential generation program, in which the shared credential generation program is provided to a supplier-side vendor management system by a customer-side automated deployment agent, are depicted in flowchart form. In certain embodiments, one or more operations of method 750 may be performed by a supplier-side credential management system, such as credential management system 216 illustrated in FIG. 2, or by a customer-side automated deployment agent, such as automated deployment agent 222 illustrated in FIG. 2. In some embodiments, method 750 may be performed once for each computer product instance when it is deployed and may not execute successfully if execution is attempted a second time. It is noted that certain operations described in method 750 may be optional or may be rearranged in different embodiments.

Method 750 may begin, at 752, with the supplier shipping a computer product instance to be deployed by a customer to the customer site, the shipping optionally including a unique identifier of the computer product instance. At 754, the method may (optionally) include a customer-side automated deployment agent assigning a unique identifier to the computer product instance. For example, in various embodiments, the assignment of a unique identifier to a particular computer product instance may be performed by the customer, by the supplier, or by mutual agreement between the customer and supplier. As described herein, the unique identifier may be or include a unique identifier of a hardware or software component of the information handling system or may be selected by the manufacturer/supplier and/or customer.

At 756, method 750 may (optionally) include the customer-side automated deployment agent assigning or obtaining a customer identifier associated with the particular computer product instance. In some embodiments, the customer identifier may be obtained from a memory accessible by the automated deployment agent. The customer identifier may be specific to a particular end user, in some embodiments. At 758, the method may (optionally) include the customer-side automated deployment agent providing the customer identifier and (optionally) providing the unique identifier of the computer product instance to a supplier-side vendor management system over a secure communication channel, e.g., if the unique identifier of the computer product instance was assigned by the customer.

At 760, method 750 may include the customer-side automated deployment agent providing a shared credential generation program to a supplier-side credential management system the over the secure communication channel. Note that in other embodiments, the customer-side automated deployment agent may provide the shared credential generation program to the supplier-side credential management system prior to shipping the computer product instance to the customer site, as shown at 627a in FIG. 6B.

At 762, method 750 may include the customer-side automated deployment agent generating security credentials for the computer product instance (e.g., an access username, an access password, an access cookie, an access token, a cryptographic key, a public key token, or a digital certificate) based on the unique identifier of the computer product instance and (optionally) the customer identifier associated with the computer product instance using the shared credential generation program.

At 764, method 750 may include the supplier-side credential management system generating, or regenerating, the security credentials (e.g., the access username, access password, access cookie, access token, cryptographic key, public key token, or digital certificate) using the shared credential generation program based on the unique identifier of the computer product instance and (optionally) the customer identifier associated with the computer product instance. Note that the actions shown in elements 762 and 764 may be performed substantially simultaneously or in any order with respect to each other, in various embodiments.

At 766, the method may include the customer-side automated deployment agent using the security credentials to log into the computer product instance and to complete deployment. For example, the security credentials may be used for a first login to an operating system executing on the computer product instance, a first login to application software executing on the computer product instance, a first login to a management environment executing on the computer product instance, or a first login to a baseboard management controller (BMC) of the computer product instance.

At 768, method 750 may include the customer-side automated deployment agent generating new security credentials for the computer product instance subsequent to completion of deployment.

As described in detail herein, a computer product instance to be deployed at a customer site, such as a compute server, network switch, router device, or storage device to be deployed in a data center, at an edge location, at a third party location, or at a remote location, such as a radio tower base unit or antenna, on behalf of a customer, may be assigned a unique identifier and security credentials may be generated specifically for that computer product instance based, at least in part, on the unique identifier of the computer product instance. Subsequently, a customer-side automated deployment agent may use the security credentials to authenticate against the computer product instance during deployment of the computer product instance, e.g., in a first login. Systems and methods for generating and using these security credentials, as described herein, may facility automated deployment of computer product instance at a customer site while providing protection against in-transit attacks or attacks by malicious actors at a customer site.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   assigning a unique identifier to a computer product instance to be deployed at a customer site;
   generating, by a supplier of the computer product instance, security credentials for the computer product instance dependent on i) the assigned unique identifier and ii) a customer identifier associated with the computer product instance;
   obtaining, by a customer-side automated deployment agent, the security credentials, at a first time, for the computer product instance that were generated dependent on the assigned unique identifier and the customer identifier;
   using, by the customer-side automated deployment agent, the security credentials during deployment of the computer product instance;
   after using the security credentials, attempting to obtain the security credentials, at a second time after the first time, from the supplier of the computer product instance; and
   in response to attempting to obtain the security credentials at the second time after the first time, preventing use of the security credentials at the second time.

2. The method of claim 1 wherein:
   generating the security credential comprises:
   a supplier-side credential management system generating the security credentials; and
   the supplier-side credential management system storing the security credentials; and
   obtaining the security credentials comprises the customer-side automated deployment agent requesting and receiving the security credentials from the supplier-side credential management system over a secure communication channel.

3. The method of claim 1, wherein:
   generating the security credential comprises generating the security credentials using a shared credential generation program;
   the method further comprises providing the shared credential generation program to the customer-side automated deployment agent; and
   obtaining the security credentials comprises the customer-side automated deployment agent generating the security credentials using the provided shared credential generation program.

4. The method of claim 1, wherein:
   generating the security credential comprises:
   receiving a shared credential generation program from the customer-side automated deployment agent; and
   generating the security credentials using the received shared credential generation program; and
   obtaining the security credentials comprises the customer-side automated deployment agent generating the security credentials using the shared credential generation program.

5. The method of claim 1, wherein the unique identifier assigned to the computer product instance comprises an identifier of a hardware of software component of the computer product instance.

6. The method of claim 1, wherein assigning the unique identifier to the computer product instance comprises the supplier or customer selecting the unique identifier.

7. The method of claim 1, wherein using the security credentials during deployment of the computer product instance comprises using the security credentials for a first login to an operating system executing on the computer product instance, a first login to application software executing on the computer product instance, a first login to a management environment executing on the computer product instance, or a first login to a baseboard management controller of the computer product instance.

8. The method of claim 1, wherein the computer product instance comprises a compute server, network switch, router device, or storage device to be deployed at the customer site.

9. The method of claim 1, wherein the security credentials comprise one or more of an access username, an access password, an access cookie, an access token, a cryptographic key, a public key token, or a digital certificate.

10. The method of claim 1, further comprising generating, by the customer-side automated deployment agent and subsequent to using the security credentials during deployment of the computer product instance, new security credentials for the computer product instance.

11. A system, comprising:
at least one computing device implementing a supplier-side credential management system for performing:
assigning a unique identifier to a computer product instance to be deployed at a customer site; and
generating security credentials for the computer product instance dependent on i) the assigned unique identifier and ii) a customer identifier associated with the computer product instance; and
at least one computing device implementing a customer-side automated deployment agent for performing:
obtaining the security credentials, at a first time, for the computer product instance that were generated dependent on the assigned unique identifier and the customer identifier;
using the security credentials during deployment of the computer product instance;
after using the security credentials, attempting to obtain the security credentials, at a second time after the first time, from the supplier of the computer product instance; and
in response to attempting to obtain the security credentials at the second time after the first time, preventing use of the security credentials at the second time.

12. The system of claim 11, wherein:
generating the security credential comprises:
the supplier-side credential management system generating the security credentials; and
the supplier-side credential management system storing the security credentials; and
obtaining the security credentials comprises the customer-side automated deployment agent requesting and receiving the security credentials from the supplier-side credential management system over a secure communication channel.

13. The system of claim 11, wherein:
generating the security credential comprises the supplier-side credential management system generating the security credentials using a shared credential generation program;
the supplier-side credential management system further performs providing the shared credential generation program to the customer-side automated deployment agent; and
obtaining the security credentials comprises the customer-side automated deployment agent generating the security credentials using the provided shared credential generation program.

14. The system of claim 11, wherein:
generating the security credential comprises:
receiving a shared credential generation program from the customer-side automated deployment agent; and
generating the security credentials using the shared credential generation program; and
obtaining the security credentials comprises the customer-side automated deployment agent generating the security credentials using the shared credential generation program.

15. The system of claim 11, wherein:
the unique identifier assigned to the computer product instance comprises an identifier of a hardware or software component of the computer product instance or a unique identifier selected by a supplier or customer; and
the security credentials comprise one or more of an access username, an access password, an access cookie, an access token, a cryptographic key, a public key token, or a digital certificate.

16. Non-transitory computer readable memory media storing instructions executable to implement:
a supplier-side credential management system configured to perform:
assigning a unique identifier to a computer product instance to be deployed at a customer site; and
generating security credentials for the computer product instance dependent on i) the assigned unique identifier and ii) a customer identifier associated with the computer product instance; and
a customer-side automated deployment agent configured to perform:
obtaining the security credentials, at a first time, for the computer product instance that were generated dependent on the assigned unique identifier and the customer identifier;
using the security credentials during deployment of the computer product instance;
after using the security credentials, attempting to obtain the security credentials, at a second time after the first time, from the supplier of the computer product instance; and
in response to attempting to obtain the security credentials at the second time after the first time, preventing use of the security credentials at the second time.

17. The media of claim 16, wherein:
generating the security credential comprises:
the supplier-side credential management system generating the security credentials; and
the supplier-side credential management system storing the security credentials; and
obtaining the security credentials comprises the customer-side automated deployment agent requesting and receiving the security credentials from the supplier-side credential management system over a secure communication channel.

18. The media of claim 16, wherein:
generating the security credential comprises the supplier-side credential management system generating the security credentials using a shared credential generation program;
the supplier-side credential management system is further configured to perform providing the shared credential generation program to the customer-side automated deployment agent; and
obtaining the security credentials comprises the customer-side automated deployment agent generating the security credentials using the provided shared credential generation program.

19. The media of claim 16, wherein:
generating the security credential comprises:
  receiving a shared credential generation program from the customer-side automated deployment agent; and
  generating the security credentials using the shared credential generation program; and
obtaining the security credentials comprises the customer-side automated deployment agent generating the security credentials using the shared credential generation program.

20. The method of claim 1, wherein the unique identifier assigned to the computer product instance comprises a randomly generated alphanumeric identifier that is mutually agreed upon by the supplier of the computer product instance and the customer-side automated deployment agent.

* * * * *